(12) United States Patent
Buzzard et al.

(10) Patent No.: US 10,351,161 B2
(45) Date of Patent: Jul. 16, 2019

(54) STEERING COLUMN WITH MANUAL RETRACTION

(71) Applicant: STEERING SOLUTIONS IP HOLDING CORPORATION, Saginaw, MI (US)

(72) Inventors: Donald A. Buzzard, Saginaw, MI (US); Michael P. Anspaugh, Bay City, MI (US); Richard P. Nash, Frankenmuth, MI (US); John F. Schulz, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 70 days.

(21) Appl. No.: 15/606,411

(22) Filed: May 26, 2017

(65) Prior Publication Data

US 2017/0341677 A1  Nov. 30, 2017

Related U.S. Application Data

(60) Provisional application No. 62/342,343, filed on May 27, 2016.

(51) Int. Cl.
*F16C 3/03* (2006.01)
*F16D 1/06* (2006.01)
(Continued)

(52) U.S. Cl.
CPC ............. *B62D 1/183* (2013.01); *B62D 1/184* (2013.01); *B62D 1/185* (2013.01); *F16C 3/03* (2013.01);
(Continued)

(58) Field of Classification Search
CPC ........ B62D 1/183; B62D 1/184; B62D 1/185; F16C 3/03; F16C 3/06; F16C 1/06; F16C 2001/103
See application file for complete search history.

(56) References Cited

U.S. PATENT DOCUMENTS 2,331,996 A * 10/1943 Maurer .................. B62D 1/185
                                                              403/104
4,138,167 A    2/1979 Ernst et al.
(Continued)

FOREIGN PATENT DOCUMENTS

CN        1722030 A      1/2006
CN        1736786 A      2/2006
(Continued)

OTHER PUBLICATIONS

China Patent Application No. 201510204221.5 Second Office Action dated Mar. 10, 2017, 8 pages.
(Continued)

*Primary Examiner* — Drew J Brown

(57) ABSTRACT

A steering column assembly for an autonomous or semi-autonomous vehicle includes a first steering shaft operatively coupleable to a steering wheel, the first steering shaft and the steering wheel rotationally coupled to each other. Also included is a second steering shaft operatively coupled to the first steering shaft, the first and second steering shafts manually telescopingly movable relative to each other between an extended position and a retracted position, the first steering shaft disengaged from the second steering shaft in the retracted position and the first steering shaft engaged with the first steering shaft in the extended position, the retracted position rotationally decoupling.

16 Claims, 10 Drawing Sheets

(51) Int. Cl.
*F16D 1/10* (2006.01)
*F16D 3/06* (2006.01)
*B62D 1/183* (2006.01)
*B62D 1/184* (2006.01)
*B62D 1/185* (2006.01)

(52) U.S. Cl.
CPC ...... *F16C 2226/80* (2013.01); *F16C 2326/24* (2013.01); *F16D 1/06* (2013.01); *F16D 3/06* (2013.01); *F16D 2001/103* (2013.01)

(56) References Cited

U.S. PATENT DOCUMENTS

| | | | |
|---|---|---|---|
| 4,315,117 A | 2/1982 | Kokubo et al. | |
| 4,337,967 A | 7/1982 | Yoshida et al. | |
| 4,402,236 A * | 9/1983 | Nishikawa | B62D 1/185 |
| | | | 403/109.5 |
| 4,503,300 A | 3/1985 | Lane, Jr. | |
| 4,503,504 A | 3/1985 | Suzumura et al. | |
| 4,561,323 A | 12/1985 | Stromberg | |
| 4,691,587 A | 9/1987 | Farrand et al. | |
| 4,836,566 A | 6/1989 | Birsching | |
| 4,921,066 A | 5/1990 | Conley | |
| 4,962,570 A | 10/1990 | Hosaka et al. | |
| 4,962,944 A | 10/1990 | Reiche et al. | |
| 4,967,618 A | 11/1990 | Matsumoto et al. | |
| 4,976,239 A | 12/1990 | Hosaka | |
| 5,186,573 A * | 2/1993 | Flotow | F16D 1/101 |
| | | | 192/110 S |
| 5,240,284 A | 8/1993 | Takada et al. | |
| 5,295,712 A | 3/1994 | Omura | |
| 5,319,803 A | 6/1994 | Allen | |
| 5,488,555 A | 1/1996 | Asgari | |
| 5,618,058 A | 4/1997 | Byon | |
| 5,668,721 A | 9/1997 | Chandy | |
| 5,690,362 A | 11/1997 | Peitsmeier et al. | |
| 5,765,116 A | 6/1998 | Wilson-Jones et al. | |
| 5,820,163 A * | 10/1998 | Thacker | B62D 1/184 |
| | | | 280/775 |
| 5,893,580 A | 4/1999 | Hoagland et al. | |
| 5,911,789 A | 6/1999 | Keipert et al. | |
| 6,070,686 A | 6/2000 | Pollmann | |
| 6,170,862 B1 | 1/2001 | Hoagland et al. | |
| 6,227,571 B1 | 5/2001 | Sheng et al. | |
| 6,301,534 B1 | 10/2001 | McDermott, Jr. | |
| 6,354,622 B1 | 3/2002 | Ulbrich et al. | |
| 6,360,149 B1 | 3/2002 | Kwon et al. | |
| 6,373,472 B1 | 4/2002 | Palalau et al. | |
| 6,381,526 B1 | 4/2002 | Higashi et al. | |
| 6,390,505 B1 | 5/2002 | Wilson | |
| 6,578,449 B1 | 6/2003 | Anspaugh et al. | |
| 6,612,393 B2 | 9/2003 | Bohner et al. | |
| 6,819,990 B2 | 11/2004 | Ichinose | |
| 7,021,416 B2 | 4/2006 | Kapaan et al. | |
| 7,048,305 B2 | 5/2006 | Muller | |
| 7,062,365 B1 | 6/2006 | Fei | |
| 7,295,904 B2 | 11/2007 | Kanevsky et al. | |
| 7,308,964 B2 | 12/2007 | Hara et al. | |
| 7,428,944 B2 | 9/2008 | Gerum | |
| 7,461,863 B2 | 12/2008 | Muller | |
| 7,495,584 B1 | 2/2009 | Sorensen | |
| 7,628,244 B2 | 12/2009 | Chino et al. | |
| 7,719,431 B2 | 5/2010 | Bolourchi | |
| 7,735,405 B2 | 6/2010 | Parks | |
| 7,793,980 B2 | 9/2010 | Fong | |
| 7,862,079 B2 | 1/2011 | Fukawatase et al. | |
| 7,894,951 B2 | 2/2011 | Norris et al. | |
| 7,909,361 B2 | 3/2011 | Oblizajek et al. | |
| 8,002,075 B2 | 8/2011 | Markfort | |
| 8,027,767 B2 | 9/2011 | Klein et al. | |
| 8,055,409 B2 | 11/2011 | Tsuchiya | |
| 8,069,745 B2 | 12/2011 | Strieter et al. | |
| 8,079,312 B2 | 12/2011 | Long | |
| 8,146,945 B2 | 4/2012 | Born et al. | |
| 8,170,725 B2 | 5/2012 | Chin et al. | |
| 8,260,482 B1 | 9/2012 | Szybalski et al. | |
| 8,352,110 B1 | 1/2013 | Szybalski et al. | |
| 8,479,605 B2 | 7/2013 | Shavrnoch et al. | |
| 8,548,667 B2 | 10/2013 | Kaufmann | |
| 8,606,455 B2 | 12/2013 | Boehringer et al. | |
| 8,634,980 B1 | 1/2014 | Urmson et al. | |
| 8,650,982 B2 | 2/2014 | Matsuno et al. | |
| 8,670,891 B1 | 3/2014 | Szybalski et al. | |
| 8,695,750 B1 | 4/2014 | Hammond et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B1 | 10/2014 | Rao et al. | |
| 8,880,287 B2 | 11/2014 | Lee et al. | |
| 8,881,861 B2 | 11/2014 | Tojo | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,950,543 B2 | 2/2015 | Heo et al. | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,032,835 B2 | 5/2015 | Davies et al. | |
| 9,045,078 B2 | 6/2015 | Tovar et al. | |
| 9,073,574 B2 | 7/2015 | Cuddihy et al. | |
| 9,092,093 B2 | 7/2015 | Jubner et al. | |
| 9,108,584 B2 | 8/2015 | Rao et al. | |
| 9,134,729 B1 | 9/2015 | Szybalski et al. | |
| 9,150,200 B2 | 10/2015 | Urhahne | |
| 9,150,224 B2 | 10/2015 | Yopp | |
| 9,164,619 B2 | 10/2015 | Goodlein | |
| 9,174,642 B2 | 11/2015 | Wimmer et al. | |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,111 B2 | 1/2016 | Davidsson et al. | |
| 9,235,211 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 | 2/2016 | Mizuno | |
| 9,290,174 B1 | 3/2016 | Zagorski | |
| 9,290,201 B1 | 3/2016 | Lombrozo | |
| 9,298,184 B2 | 3/2016 | Bartels et al. | |
| 9,308,857 B2 | 4/2016 | Lisseman et al. | |
| 9,308,891 B2 | 4/2016 | Cudak et al. | |
| 9,333,983 B2 | 5/2016 | Lathrop et al. | |
| 9,352,752 B2 | 5/2016 | Cullinane et al. | |
| 9,360,865 B2 | 6/2016 | Yopp | |
| 9,852,752 B1 | 12/2017 | Chou et al. | |
| 10,065,655 B2 | 9/2018 | Bendewald et al. | |
| 2003/0046012 A1 | 3/2003 | Yamaguchi | |
| 2003/0094330 A1 | 5/2003 | Boloorchi et al. | |
| 2003/0227159 A1 | 12/2003 | Muller | |
| 2004/0016588 A1 | 1/2004 | Vitale et al. | |
| 2004/0046346 A1 | 3/2004 | Eki et al. | |
| 2004/0099468 A1 | 5/2004 | Chernoff et al. | |
| 2004/0129098 A1 | 7/2004 | Gayer et al. | |
| 2004/0204808 A1 | 10/2004 | Satoh et al. | |
| 2004/0262063 A1 | 12/2004 | Kaufmann et al. | |
| 2005/0001445 A1 | 1/2005 | Ercolano | |
| 2005/0081675 A1 | 4/2005 | Oshita et al. | |
| 2005/0197746 A1 | 9/2005 | Pelchen et al. | |
| 2005/0275205 A1 | 12/2005 | Ahnafield | |
| 2006/0224287 A1 | 10/2006 | Izawa et al. | |
| 2006/0244251 A1 | 11/2006 | Muller | |
| 2007/0021889 A1 | 1/2007 | Tsuchiya | |
| 2007/0029771 A1 | 2/2007 | Haglund et al. | |
| 2007/0046003 A1 | 3/2007 | Mori et al. | |
| 2007/0046013 A1 | 3/2007 | Bito | |
| 2007/0241548 A1 | 10/2007 | Fong | |
| 2007/0284867 A1 | 12/2007 | Cymbal et al. | |
| 2008/0009986 A1 | 1/2008 | Lu et al. | |
| 2008/0028884 A1 | 2/2008 | Monash | |
| 2008/0217901 A1 * | 9/2008 | Olgren | B62D 1/184 |
| | | | 280/775 |

(56) References Cited

U.S. PATENT DOCUMENTS

| | | |
|---|---|---|
| 2008/0238068 A1 | 10/2008 | Kumar et al. |
| 2009/0024278 A1 | 1/2009 | Kondo et al. |
| 2009/0107284 A1* | 4/2009 | Lucas .................. B60N 2/24 74/495 |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0120142 A1 | 4/2015 | Park et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0375769 A1 | 12/2015 | Abboud et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0113712 A1 | 4/2017 | Watz |
| 2017/0151975 A1* | 6/2017 | Schmidt ................ B62D 1/181 |
| 2018/0072339 A1* | 3/2018 | Bodtker ................ B62D 1/183 |
| 2018/0134308 A1 | 5/2018 | Derocher |
| 2018/0148084 A1* | 5/2018 | Nash .................... F16C 3/03 |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102452391 A | 5/2012 |
| CN | 103419840 A2 | 12/2013 |
| CN | 103448785 A | 12/2013 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102010025197 A1 | 12/2011 |
| DE | 102015216326 B4 | 9/2016 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | 60164629 A | 8/1985 |
| JP | S60157963 A | 8/1985 |
| JP | H05162652 A | 6/1993 |
| JP | 2007253809 A | 10/2007 |
| KR | 20100063433 A | 6/2010 |
| WO | 2006099483 A1 | 9/2006 |
| WO | 2010082394 A1 | 7/2010 |
| WO | 2010116518 A1 | 10/2010 |
| WO | 2015049254 A2 | 4/2015 |

OTHER PUBLICATIONS

CN Patent Application No. 201210599006.6 Second Office Action dated Aug. 5, 2015, 5 pages.

CN Patent Application No. 201310178012.9 Second Office Action dated Dec. 28, 2015, 11 pages.

CN Patent Application No. 201410089167 First Office Action and Search Report dated Feb. 3, 2016, 9 pages.

EP Application No. 14156903.8 Extended European Search Report, dated Jan. 27, 2015, 10 pages.

EP Application No. 14156903.8 Office Action dated Nov. 16, 2015, 4 pages.

EP Application No. 14156903.8 Office Action dated May 31, 2016, 5 pages.

EP Application No. 14156903.8 Partial European Search Report dated Sep. 23, 2014, 6 pages.

EP Application No. 15152834.6 Extended European Search Report dated Oct. 8, 2015, 7 pages.

European Application No. 12196665.9 Extended European Search Report dated Mar. 6, 2013, 7 pages.

European Search Report for European Application No. 13159950.8; dated Jun. 6, 2013; 7 pages.

European Search Report for related European Application No. 15152834.6, dated Oct. 8, 2015; 7 pages.

Gillespie, Thomas D.; "Fundamentals of Vehicle Dynamics"; Society of Automotive Engineers, Inc.; published 1992; 294 pages.

Kichun, et al.; "Development of Autonomous Car—Part II: A Case Study on the Implementation of an Autonomous Driving System

(56) References Cited

OTHER PUBLICATIONS

Based on Distributed Architecture"; IEEE Transactions on Industrial Electronics, vol. 62, No. 8, Aug. 2015; 14 pages.
Office Action regarding related CN OA 201510204221.5; dated Aug. 29, 2016; 5 pgs.
Partial European Search Report for related European Patent Application No. 14156903.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
English translation regarding DE102015216326B4, ThyssenKrupp AG; 21 pgs.
CN Patent Application No. 201210599006.6 First Office Action dated Jan. 27, 2015, 9 pages.
CN Patent Application No. 201310178012.9 First Office Action dated Apr. 13, 2015, 13 pages.
English translation of Office Action regarding related CN App. No. 201710399761.2; dated Nov. 27, 2018.

\* cited by examiner

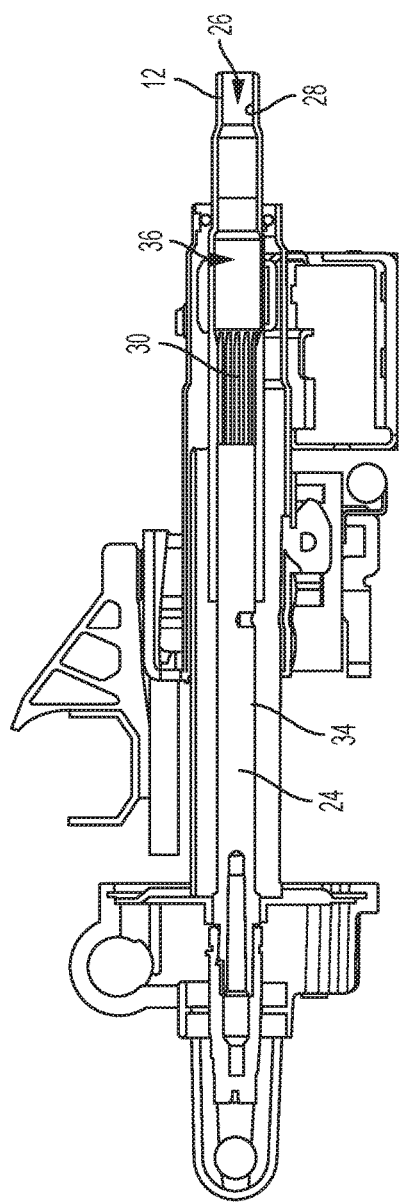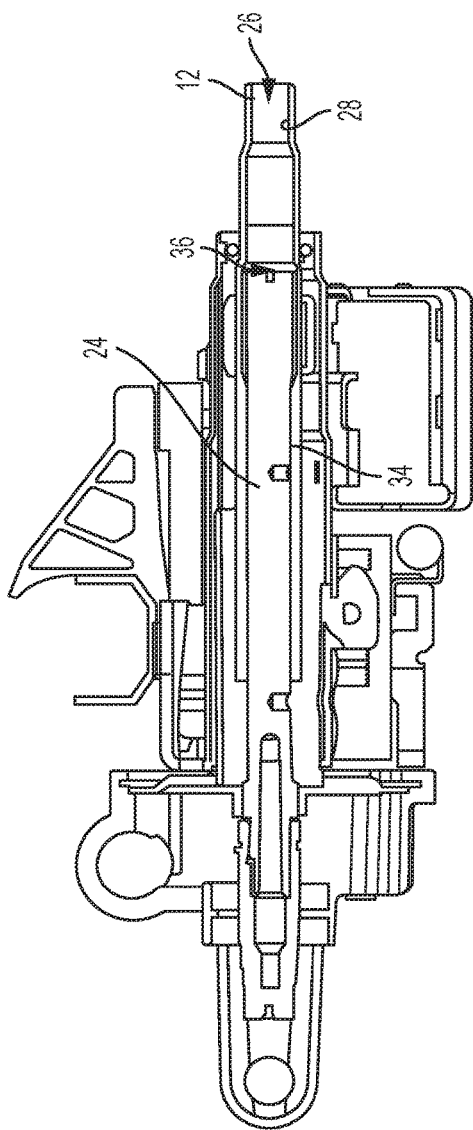

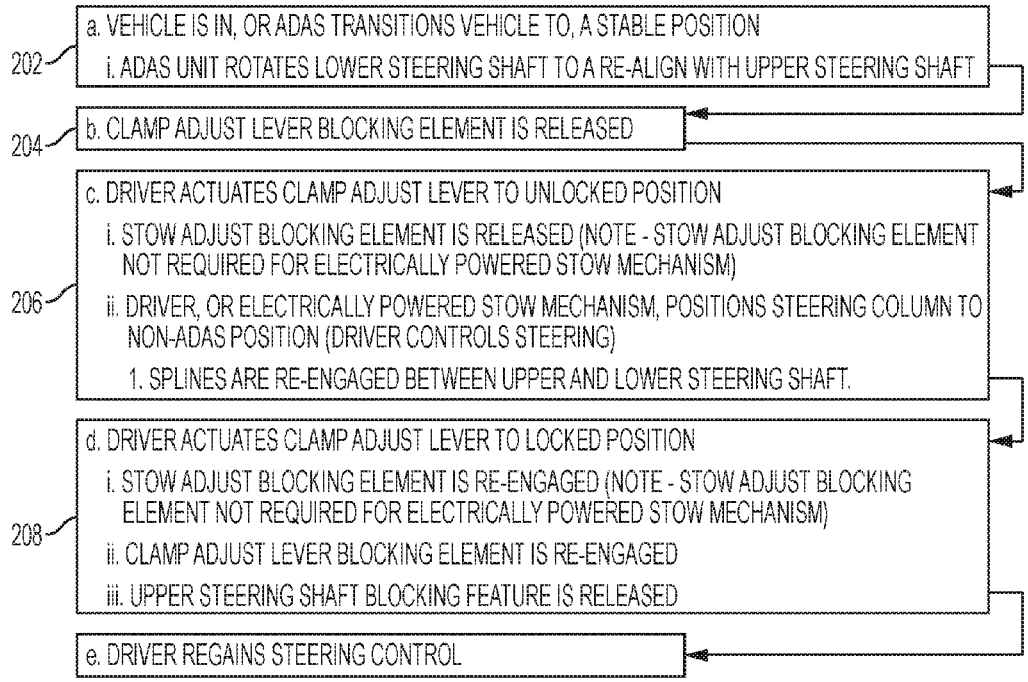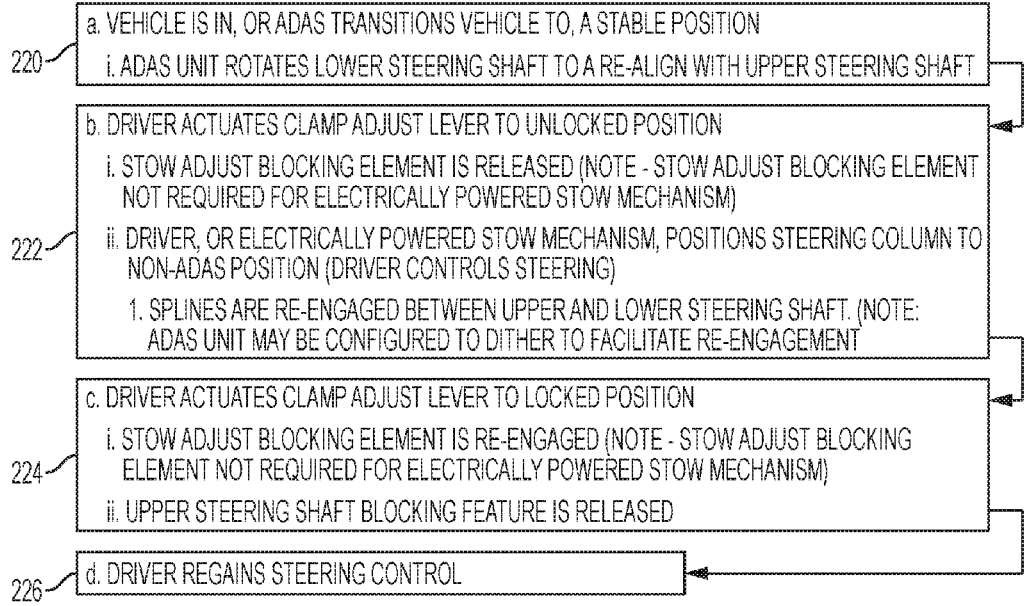
FIG. 14

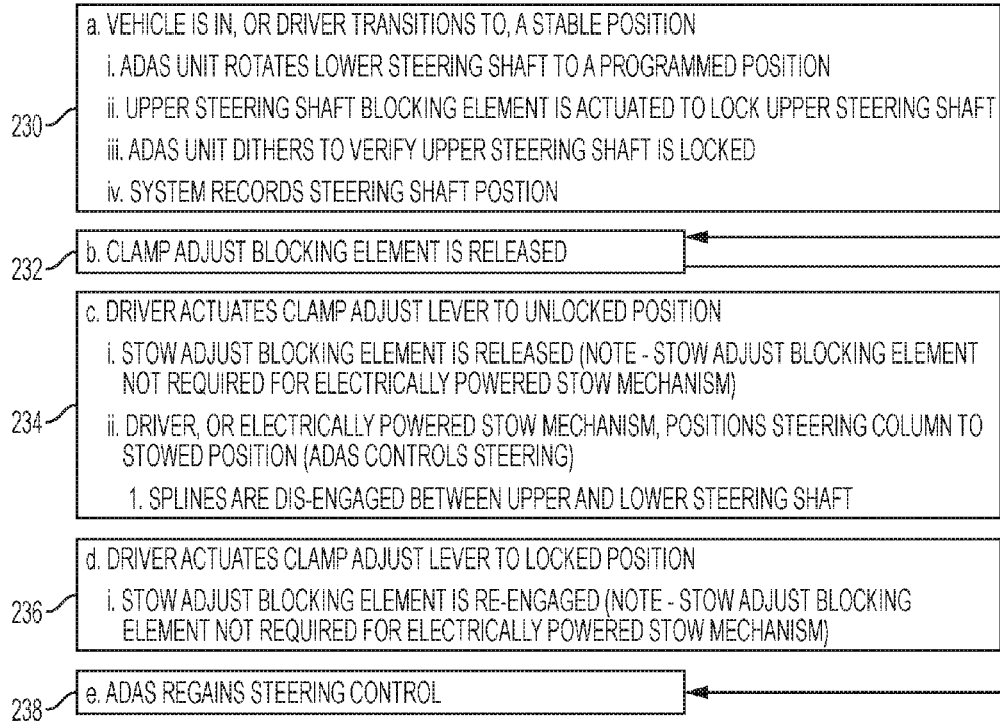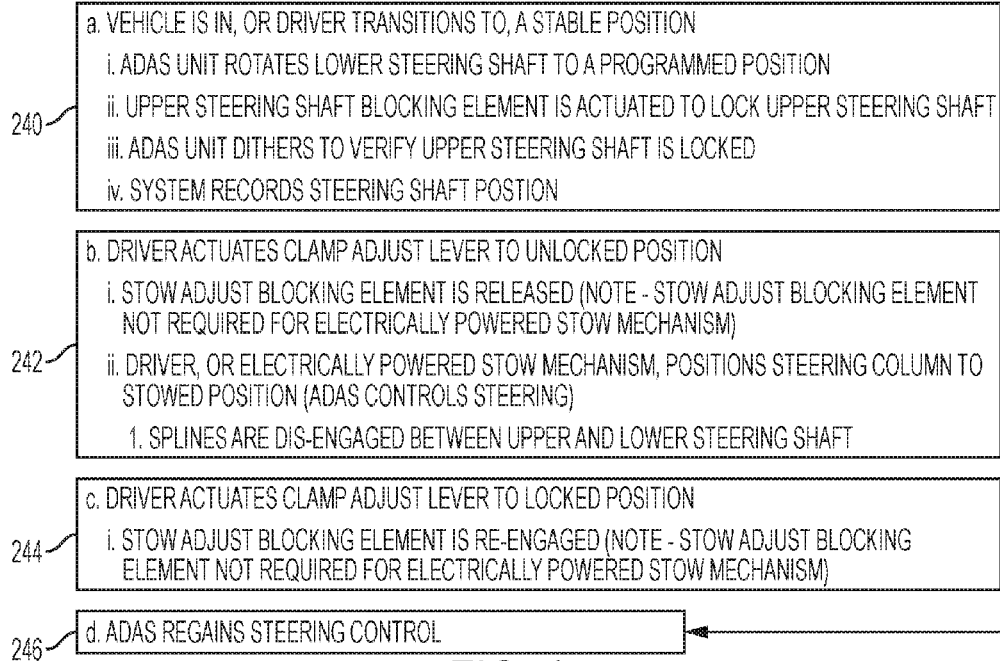
FIG. 15

STEERING COLUMN WITH MANUAL RETRACTION

CROSS-REFERENCE TO RELATED APPLICATION

This patent application claims priority to U.S. Provisional Patent Application Ser. No. 62/342,343, filed May 27, 2016, which is incorporated herein by reference in its entirety.

BACKGROUND

When a steering column's shaft line is connected to a steering gear, with an intermediate shaft, the steering wheel causes one of two things to occur. The steering wheel either creates the rotation of the intermediate shaft, and corresponding movement of the steering gear, via an input from the driver; or the steering wheel rotates if steering rotation input is controlled by a steering column mounted or steering gear mounted mechanism.

Adjustable steering column assemblies are limited to a range of motion that keeps the steering wheel within proximity of the driver's reach.

SUMMARY OF THE INVENTION

According to one aspect of the invention, a steering column assembly for an autonomous or semi-autonomous vehicle includes a first steering shaft operatively coupleable to a steering wheel, the first steering shaft and the steering wheel rotationally coupled to each other. Also included is a second steering shaft operatively coupled to the first steering shaft, the first and second steering shafts manually telescopingly movable relative to each other between an extended position and a retracted position, the first steering shaft disengaged from the second steering shaft in the retracted position and the first steering shaft engaged with the first steering shaft in the extended position, the retracted position rotationally decoupling.

According to another aspect of the invention, a steering column assembly for an autonomous or semi-autonomous vehicle includes a first steering shaft operatively coupleable to a steering wheel, the first steering shaft and the steering wheel rotationally coupled to each other. Also included is a second steering shaft operatively coupled to the first steering shaft and disposed within a hollow interior defined by the first steering shaft, the first and second steering shafts manually telescopingly movable relative to each other between an extended position and a retracted position, the first steering shaft disengaged from the second steering shaft in the retracted position and the first steering shaft engaged with the first steering shaft in the extended position, the retracted position rotationally decoupling, the steering column assembly only permitted to transition from the extended position to the retracted position if an autonomous driving mode is activated. Further included is a plurality of first shaft splines disposed on an inner surface of the first steering shaft. Yet further included is an annular cavity of the hollow interior, the annular cavity disposed radially outwardly of the first shaft splines. Also included is a plurality of second shaft splines on an outer surface of a splined portion of the second steering shaft, the second shaft splines engaged with the first shaft splines in the extended position, the second shaft splines disposed within the annular cavity of the hollow interior in the retracted position to rotationally decouple the first and second steering shafts.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is an elevational, cross-sectional view of the steering column assembly in an extended condition;

FIG. 4 is an elevational, cross-sectional view of the steering column assembly in a retracted condition;

FIG. 14 is a flow diagram illustrating a transition of the steering column assembly from the retracted position to the extended condition; and FIG. 15 is a flow diagram illustrating a transition from the extended condition to the retracted condition.

DETAILED DESCRIPTION

Referring now to the Figures, where the invention will be described with reference to specific embodiments, without limiting same, a steering column assembly with manual stowing capability is disclosed. The embodiments described herein may be employed with various types of steering columns. In particular, electric power steering systems and autonomous or semi-autonomous driving systems are examples of vehicle steering columns that may benefit from the embodiments disclosed herein. The term autonomous or semi-autonomous refers to vehicles or vehicle sub-systems that are configured to perform operations without continuous input from a driver (e.g., steering, accelerating, braking etc.) and may be equipped with Advanced Driver Assist Steering (ADAS) system(s) to allow the vehicle to be autonomously controlled using sensing, steering, and/or braking technology.

Figure 1:
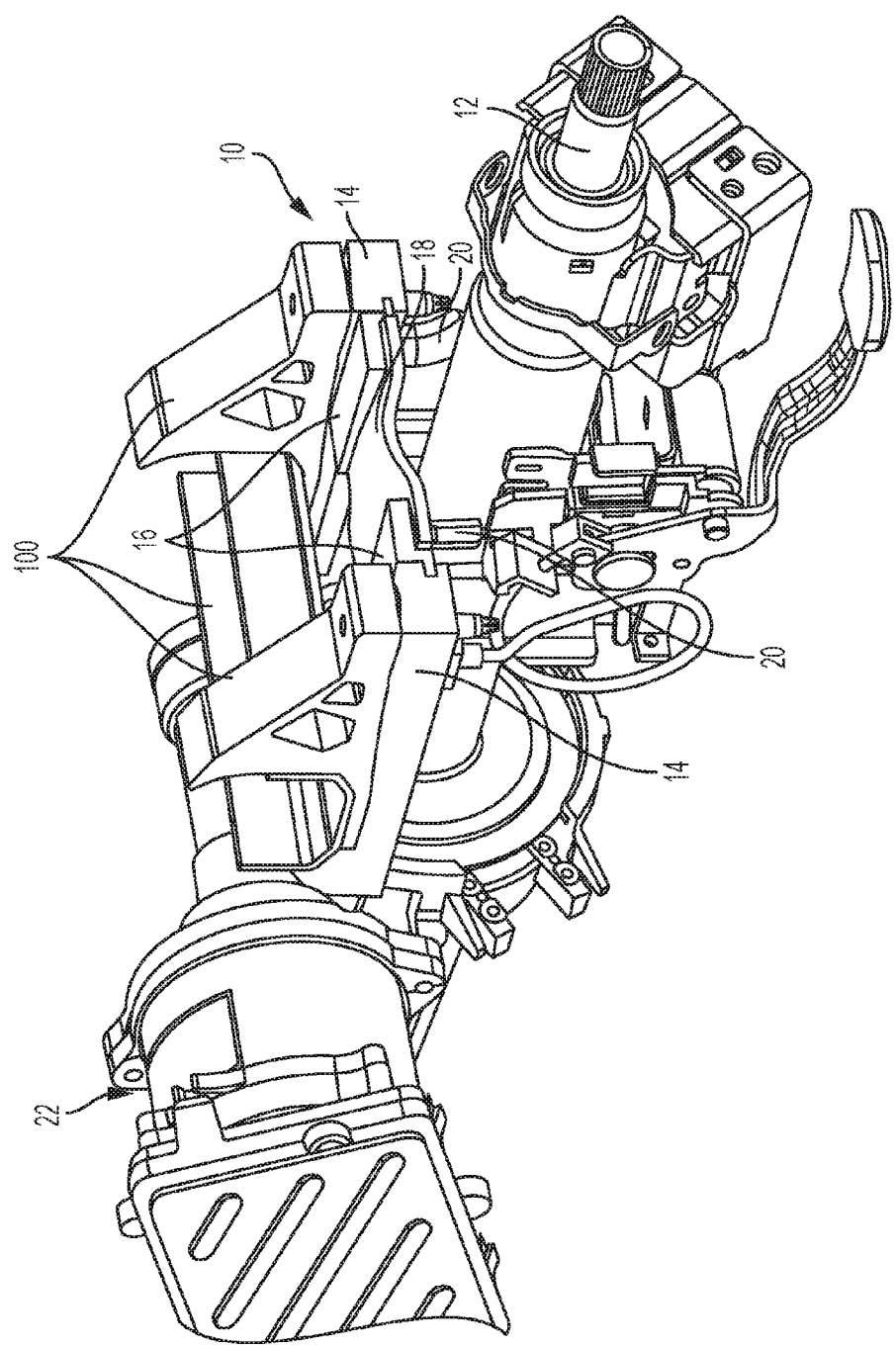
FIG. 1 is a perspective view of a steering column assembly.

Referring to FIG. 1, the steering column assembly 10 is illustrated. The steering column assembly includes a first steering shaft 12 (may be referred to as an upper steering shaft) that is coupleable with a steering input device, such as a steering wheel (not shown). The first steering shaft 12 is configured to be rotatably coupled to the steering input device when coupled thereto, such that the first steering shaft 12 and the steering wheel rotate together. In other words, rotation of one of the components results in corresponding rotation of the other component. The steering column assembly 10 also includes stationary support structures 14 that are secured to any suitable mounting structure of the vehicle, such as a stationary vehicle mounting structure 100, with a translation guide 16 operatively coupled to each of the stationary support structures 14. A central steering column support 18 is operatively coupled to a movable portion 20 of the steering column assembly 10 and coupled to the translation guides 16. As the movable portion 20 translates, the central steering column support 18 and the translation guides 16 translate axially relative to the stationary support structures 14. Also shown is a steering assist system 22 that provides a torque to the steering column assembly 10. The steering assist system 22 may be a steering column or steering gear electric power steering system controlled by an ADAS system, for example.

Referring now to FIGS. 2-6, the steering column assembly 10 also includes a second steering shaft 24 (may be referred to as a lower steering shaft) that is selectively coupled to the first steering shaft 12. As shown, the second steering shaft 24 includes at least a portion thereof that is disposed within a hollow interior 26 defined by an inner surface 28 of the first steering shaft 12. The first and second steering shafts 12, 24 are selectively translated in an axial direction (substantially corresponding to a longitudinal direction of the steering column assembly 10), relative to each other, to transition the steering shafts 12, 24 between an engaged condition and a disengaged condition.

Figure 5:
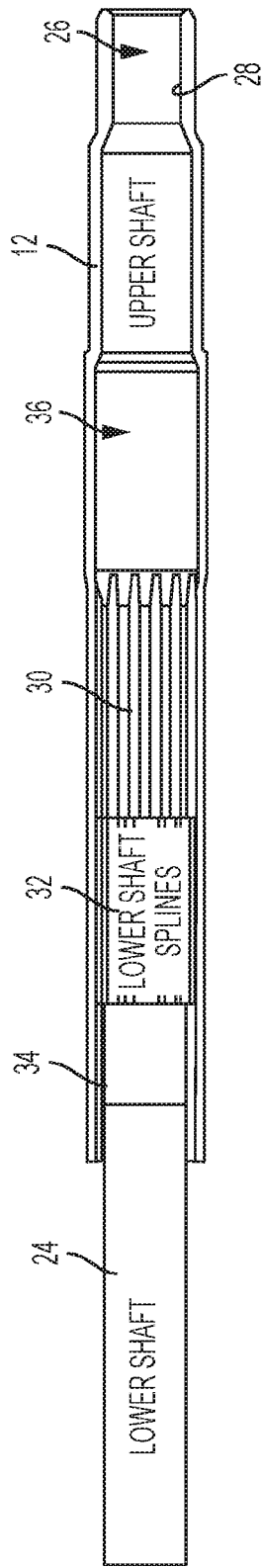
FIG. 5 is an elevational, cross-sectional view of the upper shaft and the lower shaft in an engaged condition.

The engaged condition is illustrated in FIGS. 3 and 5. In the engaged condition, the first and second steering shafts 12, 24 are engaged via a splined engagement. In particular, a plurality of axially extending first shaft splines 30 and a plurality of axially extending second shaft splines 32 are engaged with each other to rotatably couple the first and second steering shafts 12, 24. Rotably coupling the steering shafts 12, 24 results in rotation of one shaft to cause corresponding rotation of the other shaft. The first shaft splines 30 are disposed on the inner surface 28 of a splined region of the first steering shaft 12. The second shaft splines 32 are disposed on an outer surface 34 of a splined portion of the second steering shaft 24. The engaged condition of the first and second shaft splines 30, 32 is present over a range of translation of the first and second steering shafts 12, 24. This range of motion is defined as an extended position (also referred to herein as an un-stowed position) of the steering column assembly 10. Over this range of motion, a driver of the vehicle is able to manually steer the vehicle by providing an input command via the steering wheel. Therefore, the steering column assembly 10 is retractable to a first retraction limit in the un-stowed position. This first retraction limit is a typical telescope retraction limit provided by steering column assemblies.

Figure 2:
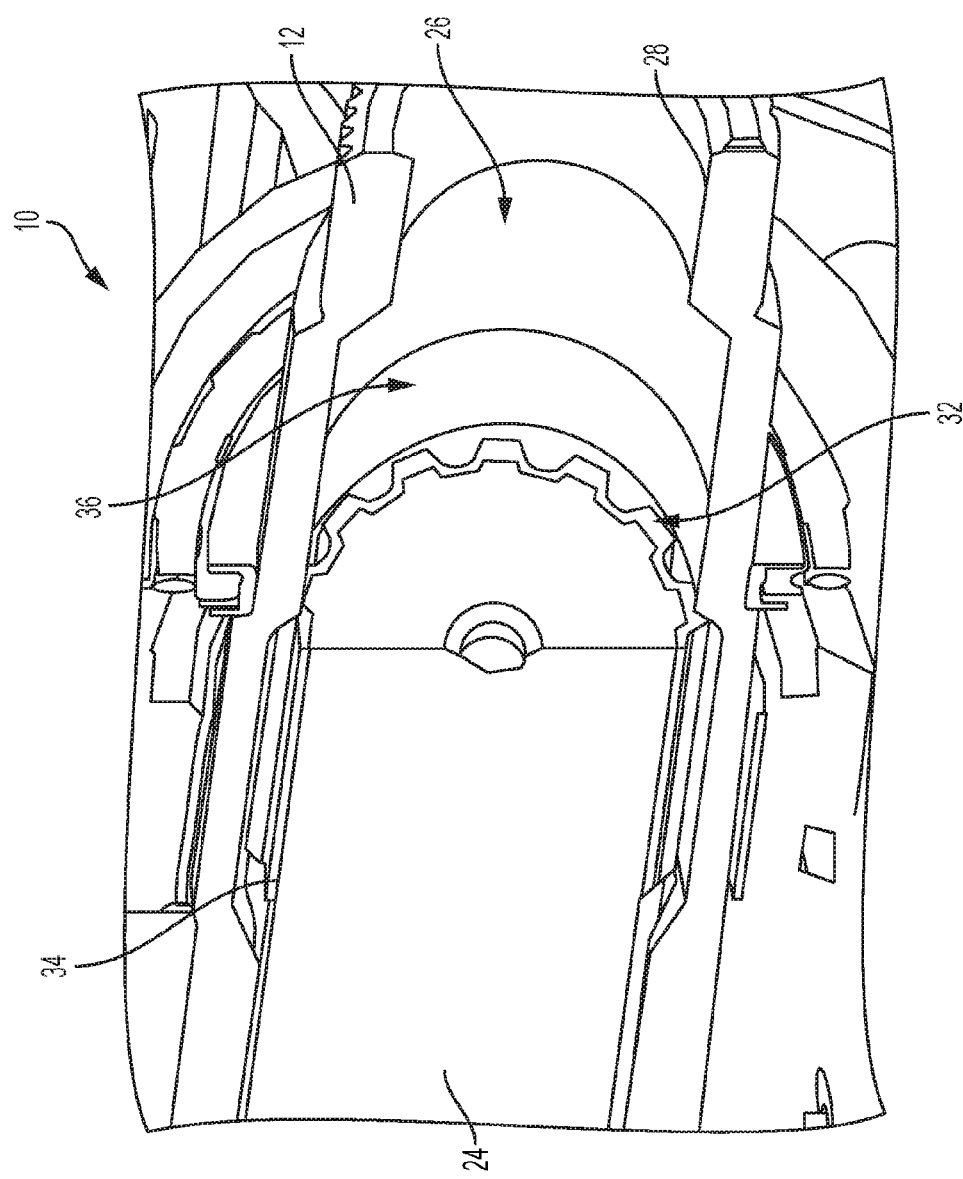
FIG. 2 is a perspective, cross-sectional view of an upper shaft and a lower shaft of the steering column assembly.
Figure 6:
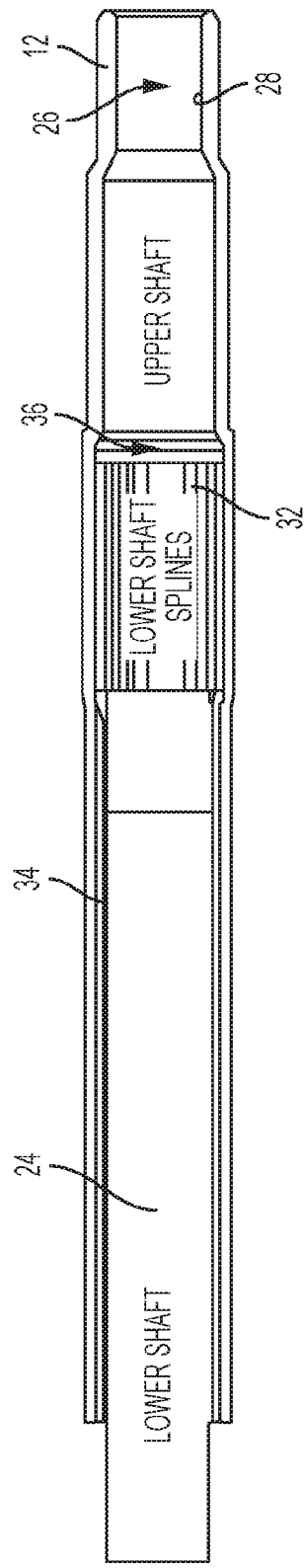
FIG. 6 is an elevational, cross-sectional view of the upper shaft and the lower shaft in a disengaged condition.

As shown in FIGS. 2, 4 and 6, the steering column assembly 10 is retractable to a second retraction limit that is greater than the above-describe first retraction limit. In other words, the steering column assembly 10 is retractable (i.e., translation away from driver) to a greater extent, relative to the first retraction limit. This degree of retraction is referred to herein as a stowed position (also referred to herein as a retracted position) of the steering column assembly 10. In the stowed position the first and second steering shafts 12, 24 are in a disengaged condition that rotatably decouples the steering shafts 12, 24. A rotatably decoupled condition allows the second steering shaft 24 to rotate in response to steering assist input and/or rotational movement of the road wheels of the vehicle, but not having the rotation of the second steering shaft 24 imparting rotation on the first steering shaft 12. This maintains the steering wheel in a stationary position which may be beneficial for numerous reasons. A rotationally stationary steering wheel avoids driver distraction or uncertainty and provides the opportunity to use the steering wheel for other functional purposes other than steering the vehicle. Retraction to the stowed position is only permitted when the vehicle is prepared to be steered in an appropriate autonomous level.

Translation of the first steering shaft 12 axially displaces the first steering shaft 12 relative to the second steering shaft 24. This movement moves the splined portions of the first and second steering shafts 12, 24 out of engagement and disposes the second shaft splines 32 within an annular cavity 36 defined by the inner surface 28 of the first steering shaft 12. The annular cavity 36 is recessed relative to the splined portion of the first steering shaft 12, thereby being located radially outwardly of the splined portion. As such, when the second shaft splines 32 are disposed within the annular cavity 36, rotation of the second steering shaft 24 does not rotate the first steering shaft 12.

Figure 7:
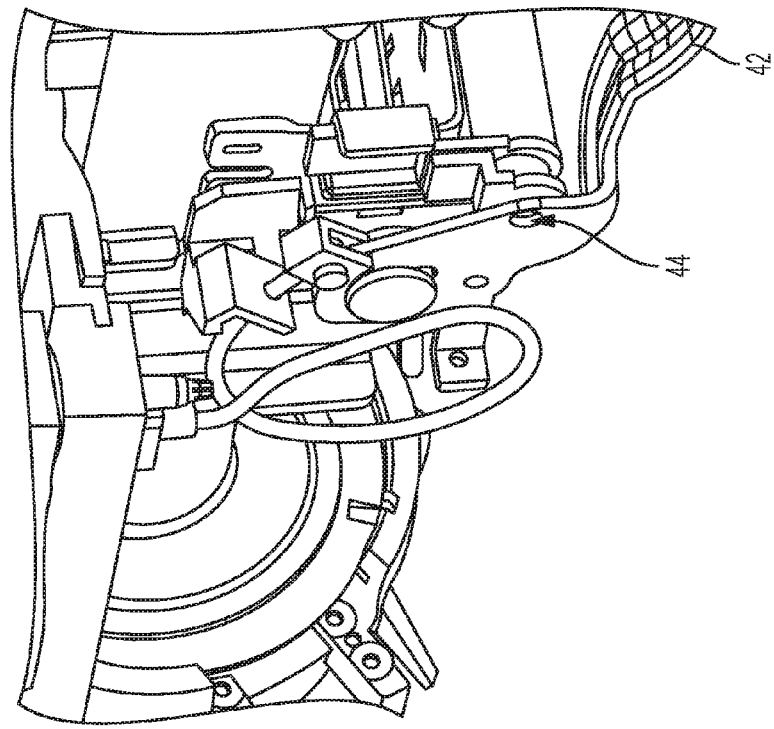
FIG. 7 is a perspective view of a lever locking component in a first condition.
Figure 8:
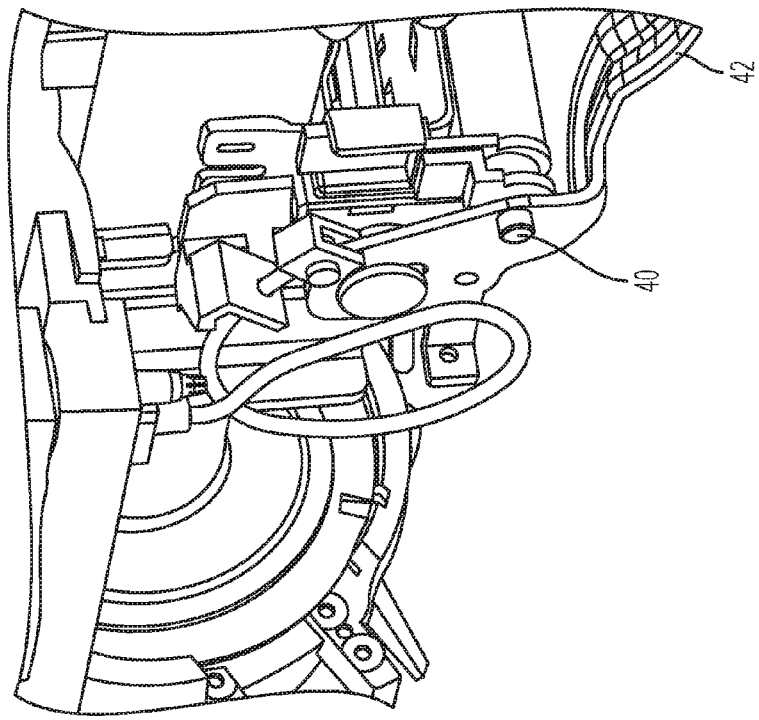
FIG. 8 is a perspective view of the lever locking component in a second condition.

Referring now to FIGS. 7 and 8, a lever locking component 40 of the steering column assembly 10 is illustrated. The lever locking component 40 prevents or allows adjustment of a lever 42 that controls whether the steering column assembly 10 is in a clamped or unclamped condition. In the unclamped condition, the driver is permitted to adjust the steering shafts 12, 24 relative to each other. In the clamped condition, the driver is unable to perform such adjustment.

The lever locking component 40 is a protruding element, such as the illustrated pin, that extends in a substantially lateral direction (i.e., cross-car direction). The lever locking component 40 is selectively extendible and retractable in response to a condition of the steering column assembly 10. Extension and retraction of the lever locking component 40 may be facilitated by a solenoid or any other suitable actuation device based on the steering column condition. In the extended position (FIG. 7), the lever locking component 40 is disposed within a lever aperture 44 defined by the lever 42 to prevent movement of the lever 42 (i.e., engaged condition). In the retracted position (FIG. 8), the lever locking component 40 is not disposed within the lever aperture 44 to allow movement of the lever 42 (i.e., disengaged condition).

Figure 9:
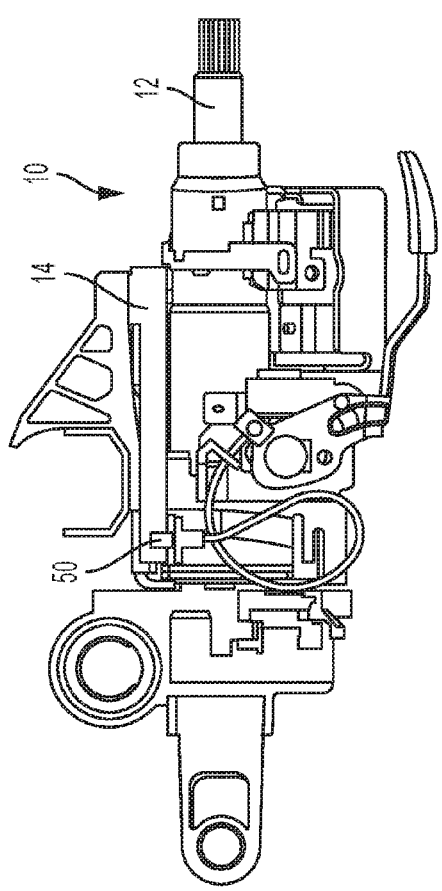
FIG. 9 is an elevational view of the steering column assembly in the retracted condition with a stow adjust blocking element in a first condition.
Figure 10:
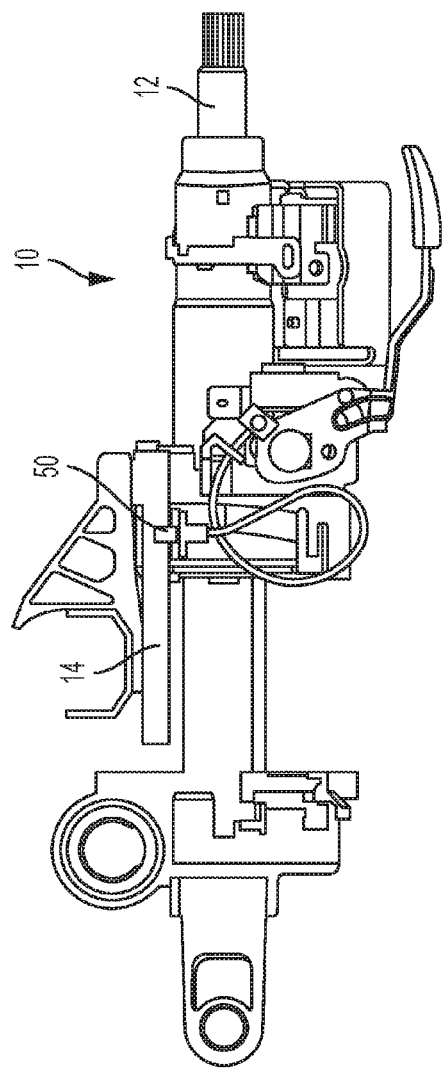
FIG. 10 is an elevational view of the steering column assembly in the extended condition with the stow adjust blocking element in the first condition.
Figure 11:
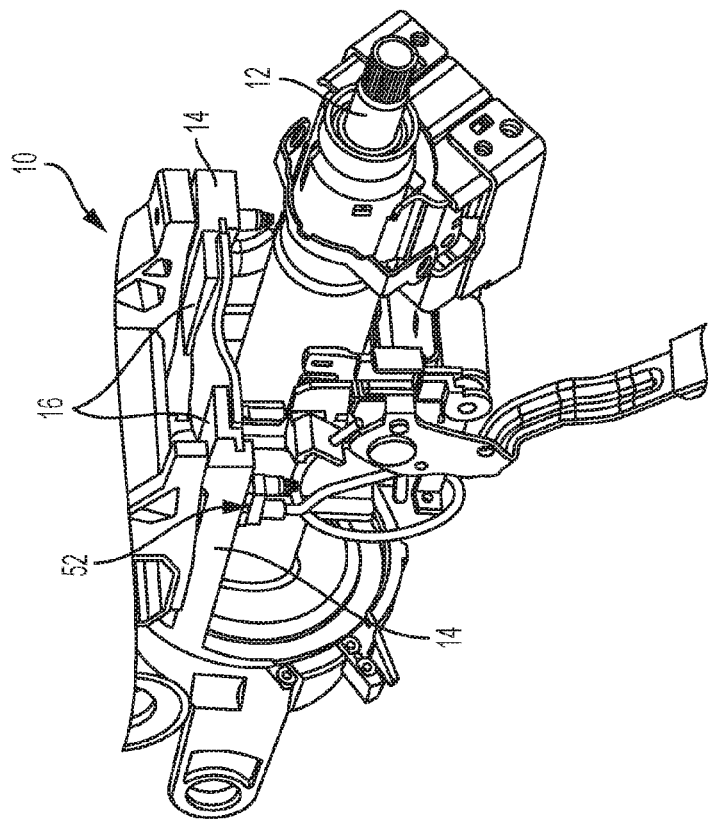
FIG. 11 is a perspective view of the steering column assembly in the retracted condition with the stow adjust blocking element in a second condition.
Figure 12:
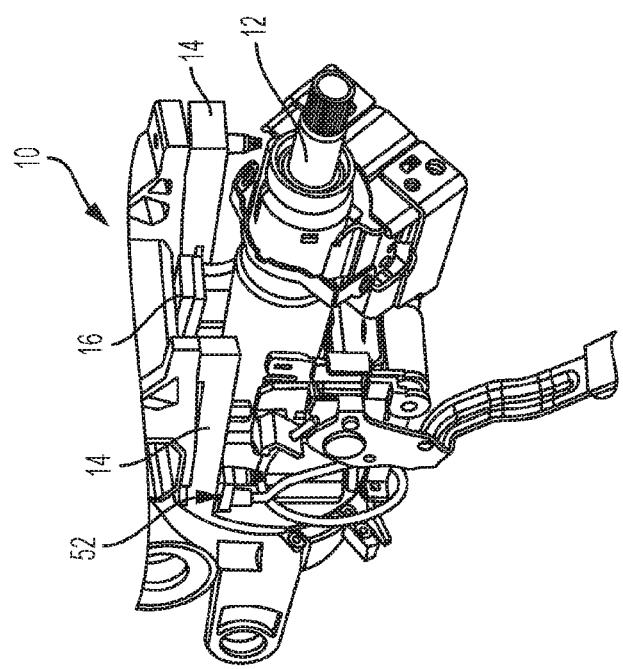
FIG. 12 is a perspective view of the steering column assembly in the extended condition with the stow adjust blocking element in the second condition.

Referring now to FIGS. 9-12, a stow adjust blocking element 50 is illustrated. The stow adjust blocking element 50 is movable between an engaged condition (FIGS. 9 and 10) and a disengaged condition (FIGS. 11 and 12). As shown, in the engaged condition, the stow adjust blocking element 50 is disposed within a stow aperture 52 defined by one of the stationary support structures 14. In this condition, the translation guides 16, and therefore the movable portion of the steering column assembly 10 is not permitted to transition from the stowed or un-stowed position or vice versa. FIG. 9 illustrates the steering column assembly 10 locked in the stowed position and FIG. 10 illustrates the steering column assembly 10 locked in the unstowed position. In the illustrated embodiment, and as described above, the stow adjust blocking element 50 is part of, or coupled to, the translation guide 16 and the stow aperture 52 is defined by the stationary support structure 14. However, the configuration is reversed in some embodiments. Specifically, the stow adjust blocking element 50 may be part of, or coupled to, the stationary support structure 14 and the stow aperture 52 is defined by the translation guide 16.

In the disengaged condition, the stow adjust blocking element 50 is retracted out of the stow aperture 52. In this condition, the translation guides 16, and therefore the movable portion of the steering column assembly 10 are permitted to transition from the stowed or un-stowed position or vice versa. FIG. 11 illustrates the steering column assembly 10 unlocked in the stowed position and FIG. 12 illustrates the steering column assembly 10 unlocked in the un-stowed position.

The stow adjust blocking element 50 is actuated by any suitable mechanism. The element 50 may be cable-driven or electrically actuated, for example. In addition to locking or unlocking the steering column assembly 10, the element 50, with corresponding position sensor(s) (not shown), verifies the position of the steering column assembly in either the stowed or un-stowed position.

Figure 13:
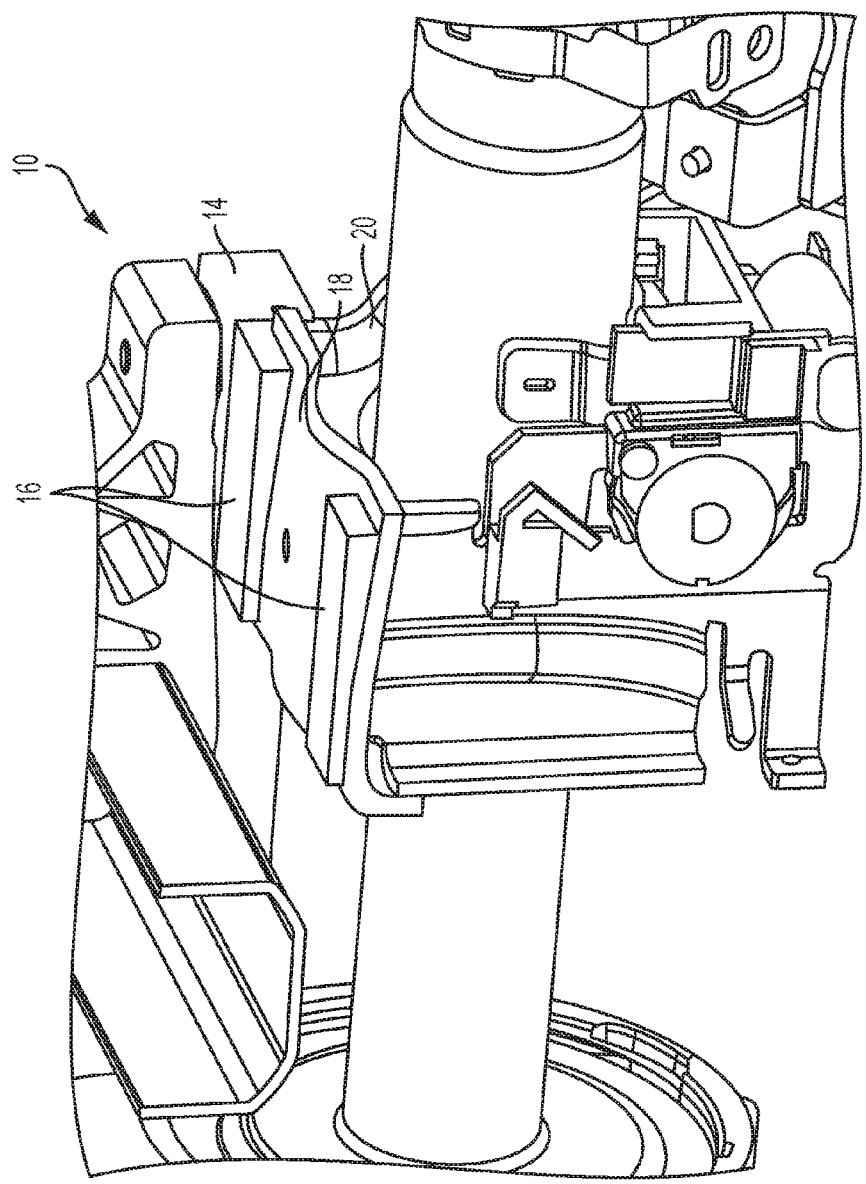
FIG. 13 is a perspective view of a portion of the steering column assembly illustrating another aspect of the disclosure.

Referring to FIG. 13, the structural relationship between the translation guides 16 and the central steering column support 18 is shown. This connection may be a frangible connection to allow for impact related translation. Frangible connections may also be made between several other components of the steering column assembly 10. For example, the connection between the blocking element 50 and the stationary support structure 14 may be frangible. Additionally, frangible connections between the translation guides 16, the central steering column support 18, and/or the stationary structures 14 are provided in some embodiments. The frangible connections allow impact initiated motion of the first steering shaft 12 relative to the stationary vehicle mounting structure 100.

FIGS. 14 and 15 illustrate flow diagrams associated with a method and system of transitioning the steering column assembly. FIG. 14 illustrates transition from the stowed condition to the un-stowed condition. For a system without a rake or telescope adjust feature, the vehicle is in, or the ADAS transitions the vehicle to, a stable position by rotating the second, or lower, steering shaft to realign with the first, or upper, steering shaft, as represented in block 202. The lever locking component is released, as shown in block 204. Block 206 illustrates the lever being adjusted by the driver to the unlocked position. To do so, the stow adjust blocking element is released, but this element is not required for electrically powered stow mechanisms. The driver, or an electrically powered stow mechanism, then positions the steering column to the un-stowed position to allow the driver to control steering. The steering shaft splines are re-engaged between the upper and lower steering shafts. The lever locking component is then actuated to the locked position, as shown in block 208. The stow adjust blocking element is re-engaged, the lever locking component is re-engaged. The upper steering shaft blocking feature is then released. The driver then may regain steering control, as shown in block 210.

For a system with a rake and/or telescope adjust feature, the vehicle is in, or the ADAS transitions the vehicle to, a stable position by rotating the second, or lower, steering shaft to realign with the first, or upper, steering shaft, as represented in block 220. Block 222 illustrates the lever being adjusted by the driver to the unlocked position. To do so, the stow adjust blocking element is released, but this element is not required for electrically powered stow mechanisms. The driver, or an electrically powered stow mechanism, then positions the steering column to the un-stowed position to allow the driver to control steering. The steering shaft splines are re-engaged between the upper and lower steering shafts. It is to be appreciated that the ADAS unit may be configured to dither to facilitate re-engagement. The lever locking component is then actuated to the locked position, as shown in block 224. The stow adjust blocking element is re-engaged and the upper steering shaft blocking feature is then released. The driver then may regain steering control, as shown in block 226.

FIG. 15 illustrates transition from the un-stowed condition to the stowed condition. For a system without a rake or telescope adjust feature, the vehicle is in, or the driver transitions the vehicle to, a stable position, as represented by block 230. The ADAS unit rotates the second, or lower, steering shaft to a programmed position. The upper steering shaft blocking element is actuated to lock the upper steering shaft, the ADAS unit dithers to verify that the upper steering shaft is locked, and the system records the steering shaft position. As shown in block 232, the lever locking component is released. Block 234 illustrates the lever locking component being actuated to the unlocked position. To do so, the stow adjust blocking element is released, but this element is not required for electrically powered stow mechanisms. The driver, or an electrically powered stow mechanism, then positions the steering column to the stowed position to allow the ADAS to control steering. The steering shaft splines are disengaged between the upper and lower steering shafts. As shown in block 236, the driver actuates the lever locking component to the locked position and the stow adjust blocking element is re-engaged. ADAS may then regain steering control, as shown in block 238.

For a system with a rake and/or telescope adjust feature, the vehicle is in, or the driver transitions the vehicle to, a stable position, as represented by block 240. The ADAS unit rotates the second, or lower, steering shaft to a programmed position. The upper steering shaft blocking element is actuated to lock the upper steering shaft, the ADAS unit dithers to verify that the upper steering shaft is locked, and the system records the steering shaft position. Block 242 illustrates the lever locking component being actuated to the unlocked position. To do so, the stow adjust blocking element is released, but this element is not required for electrically powered stow mechanisms. The driver, or an electrically powered stow mechanism, then positions the steering column to the stowed position to allow the ADAS to control steering. The steering shaft splines are disengaged between the upper and lower steering shafts. As shown in block 244, the driver actuates the lever locking component to the locked position and the stow adjust blocking element is re-engaged. ADAS may then regain steering control, as shown in block 246.

The embodiments disclosed herein provide a stowed steering wheel position that is extended beyond a standard forward telescope position. The steering column assembly 10 achieves a stationary steering wheel position when the column is in the stowed position and the vehicle's steering is being actuated by the steering column or steering gear mounted mechanism, and it allows the driver to manually steer the vehicle when the steering column is in the extended or un-stowed position. The steering column assembly provides the ability to stow or un-stow a steering wheel on a steering column that has an intermediate shaft connection between the steering column and steering gear.

A method of operation of the steering column assembly 10 is provided in which a module is provided for the driver to select a non-autonomous (i.e., manual) mode through a user interface. The transition to driver control mode is initiated, with the starting point having the steering column stowed with a stationary steering wheel.

The ADAS system rotates the second steering shaft 24 to re-align with the first steering shaft 12. A stable position is defined as travelling in a straight line, stationary or in parked position, for example. The blocking element 50 is released and the driver actuates the lever 42 to an unlocked position. The stow adjust blocking element 50 is then released. The driver, or electrically powered stow mechanism, positions the steering column to the un-stowed position, where the driver can control steering. It is to be appreciated that some embodiments allow autonomous or manual steering in the un-stowed position. A stow mechanism may optionally use a dithering feature to achieve this position. The splines are re-engaged between steering shafts 12, 24. The driver actuates the lever 42 to the locked position, and the stow adjust blocking element 50 is re-engaged. The lever 42 is then re-engaged, and the blocking feature is released. This allows the driver to regain steering control.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly for an autonomous or semi-autonomous vehicle comprising:
    a first steering shaft operatively coupleable to a steering wheel, the first steering shaft and the steering wheel rotationally coupled to each other; and
    a second steering shaft operatively coupled to the first steering shaft, the first and second steering shafts telescopingly moveable relative to each other between an extended position and a retracted position, the first steering shaft disengaged from the second steering shaft in the retracted position and the first steering shaft engaged with the second steering shaft in the extended position, the retracted position rotationally decoupling, the first steering shaft configured to axially engage and disengage with the second steering shaft, the first steering shaft defining a hollow interior, a portion of the second steering shaft disposed within the hollow interior, wherein the second steering shaft includes a plurality of second shaft splines on an outer surface of a splined portion of the second steering shaft, the second shaft splines engaged with first shaft splines on an inner surface of the first steering shaft in the extended position, the second shaft splines disposed within an annular cavity of the hollow interior in the retracted position, the annular cavity defined by an annular wall disposed radially outwardly of the first shaft splines to rotationally decouple the first and second steering shafts.

2. The steering column assembly of claim 1, wherein the first steering shaft is retractable over a first range of movement corresponding to splined engagement between the first and second steering shafts in the extended position, the first steering shaft further retractable over a second range of movement corresponding to the retracted position that exceeds the splined engagement between the first and second steering shafts.

3. A steering column assembly for an autonomous or semi-autonomous vehicle comprising:
    a first steering shaft operatively coupleable to a steering wheel, the first steering shaft and the steering wheel rotationally coupled to each other;
    a second steering shaft operatively coupled to the first steering shaft, the first and second steering shafts telescopingly moveable relative to each other between an extended position and a retracted position, the first steering shaft disengaged from the second steering shaft in the retracted position and the first steering shaft engaged with the second steering shaft in the extended position, the retracted position rotationally decoupling; and
    a lever locking component engageable with a lever aperture defined by a column adjustment lever to prevent lever adjustment in an engaged condition and to allow lever adjustment in a disengaged condition.

4. The steering column assembly of claim 3, wherein the first steering shaft is retractable over a first range of movement corresponding to splined engagement between the first and second steering shafts in the extended position, the first steering shaft further retractable over a second range of movement corresponding to the retracted position that exceeds the splined engagement between the first and second steering shafts.

5. A steering column assembly for an autonomous or semi-autonomous vehicle comprising:
    a first steering shaft operatively coupleable to a steering wheel, the first steering shaft and the steering wheel rotationally coupled to each other;
    a second steering shaft operatively coupled to the first steering shaft, the first and second steering shafts telescopingly moveable relative to each other between an extended position and a retracted position, the first steering shaft disengaged from the second steering shaft in the retracted position and the first steering shaft engaged with the second steering shaft in the extended position, the retracted position rotationally decoupling; and
    a stow adjust blocking element engageable with a stationary support structure of the steering column assembly, the stow adjust blocking element locking and verifying the position of the steering column assembly in an engaged condition and allowing movement in the disengaged condition.

6. The steering column assembly of claim 5, wherein the first steering shaft is retractable over a first range of movement corresponding to splined engagement between the first and second steering shafts in the extended position, the first steering shaft further retractable over a second range of movement corresponding to the retracted position that exceeds the splined engagement between the first and second steering shafts.

7. A steering column assembly for an autonomous or semi-autonomous vehicle comprising:
    a first steering shaft operatively coupleable to a steering wheel, the first steering shaft and the steering wheel rotationally coupled to each other; and
    a second steering shaft operatively coupled to the first steering shaft, the first and second steering shafts telescopingly moveable relative to each other between an extended position and a retracted position, the first steering shaft disengaged from the second steering shaft in the retracted position and the first steering shaft engaged with the second steering shaft in the extended position, the retracted position rotationally decoupling, wherein the steering column assembly is only permitted to transition from the extended position to the retracted position if an autonomous driving mode is activated.

8. The steering column assembly of claim 7, wherein a driver selects a manual driving mode through a user interface.

9. The steering column assembly of claim 8, wherein the steering column assembly sequentially transitions from the autonomous driving mode to the manual driving mode, the transition including rotationally coupling the first and second steering shafts.

10. The steering column assembly of claim 7, wherein the first steering shaft is retractable over a first range of movement corresponding to splined engagement between the first and second steering shafts in the extended position, the first steering shaft further retractable over a second range of movement corresponding to the retracted position that exceeds the splined engagement between the first and second steering shafts.

11. A steering column assembly for an autonomous or semi-autonomous vehicle comprising:
  a first steering shaft operatively coupleable to a steering wheel, the first steering shaft and the steering wheel rotationally coupled to each other;
  a second steering shaft operatively coupled to the first steering shaft and disposed within a hollow interior defined by the first steering shaft, the first and second steering shafts manually telescopingly moveable relative to each other between an extended position and a retracted position, the first steering shaft disengaged from the second steering shaft in the retracted position and the first steering shaft engaged with the first steering shaft in the extended position, the retracted position rotationally decoupling, the steering column assembly only permitted to transition from the extended position to the retracted position if an autonomous driving mode is activated;
  a plurality of first shaft splines disposed on an inner surface of the first steering shaft;
  an annular cavity of the hollow interior, the annular cavity disposed radially outwardly of the first shaft splines; and
  a plurality of second shaft splines on an outer surface of a splined portion of the second steering shaft, the second shaft splines engaged with the first shaft splines in the extended position, the second shaft splines disposed within the annular cavity of the hollow interior in the retracted position to rotationally decouple the first and second steering shafts.

12. The steering column assembly of claim 11, further comprising a lever locking component engageable with a lever aperture defined by a column adjustment lever to prevent lever adjustment in an engaged condition and to allow lever adjustment in a disengaged condition.

13. The steering column assembly of claim 11, further comprising a stow adjust blocking element engageable with a stationary support structure of the steering column assembly, the stow adjust blocking element locking and verifying the position of the steering column assembly in an engaged condition and allowing movement in the disengaged condition.

14. The steering column assembly of claim 11, wherein the first steering shaft is retractable over a first range of movement corresponding to splined engagement between the first and second steering shafts in the extended position, the first steering shaft further retractable over a second range of movement corresponding to the retracted position that exceeds the splined engagement between the first and second steering shafts.

15. The steering column assembly of claim 11, wherein a driver selects a manual driving mode through a user interface.

16. The steering column assembly of claim 15, wherein the steering column assembly sequentially transitions from the autonomous driving mode to the manual driving mode, the transition including rotationally coupling the first and second steering shafts.

* * * * *